United States Patent
Lolato

(10) Patent No.: US 6,882,071 B2
(45) Date of Patent: Apr. 19, 2005

(54) MULTIPLE-FUNCTION PUMPING DEVICE FOR FOUNTAINS, ORNAMENTAL FOUNTAINS AND THE LIKE

(75) Inventor: Samuele Lolato, Pove Del Grappa (IT)

(73) Assignee: Eden SRL, Vicenza (IT)

( * ) Notice: Subject to any disclaimer, the term of this patent is extended or adjusted under 35 U.S.C. 154(b) by 42 days.

(21) Appl. No.: 10/413,006

(22) Filed: Apr. 14, 2003

(65) Prior Publication Data

US 2003/0197441 A1 Oct. 23, 2003

(30) Foreign Application Priority Data

Apr. 17, 2002 (IT) ........................................ VI2002A0070

(51) Int. Cl.⁷ ................................................. F21S 8/00
(52) U.S. Cl. ........................... 310/73; 310/87; 310/254; 362/562; 239/18
(58) Field of Search ........................... 310/87, 73, 254; 362/562; 239/18, 23

(56) References Cited

U.S. PATENT DOCUMENTS

| | | | | | |
|---|---|---|---|---|---|
| 1,954,704 A | * | 4/1934 | Kraus | ........................... | 239/23 |
| 2,064,680 A | * | 12/1936 | Naul | ........................... | 307/155 |
| 2,242,800 A | * | 5/1941 | Olson | ........................... | 307/155 |
| 3,088,675 A | * | 5/1963 | Bone | ........................... | 239/20 |
| 3,337,133 A | * | 8/1967 | Duerkob | ........................... | 239/18 |
| 3,353,044 A | * | 11/1967 | Jaffe | ........................... | 310/73 |
| 4,503,346 A | * | 3/1985 | Bertram et al. | ........................... | 310/49 R |
| 4,554,471 A | * | 11/1985 | Bertram et al. | ........................... | 310/49 R |
| 4,564,889 A | | 1/1986 | Bolson | | |
| 5,767,606 A | * | 6/1998 | Bresolin | ........................... | 310/254 |
| 6,030,108 A | * | 2/2000 | Ishiharada et al. | ........................... | 362/562 |
| 6,196,471 B1 | | 3/2001 | Ruthenberg | | |
| 6,479,915 B2 | * | 11/2002 | Hsueh | ........................... | 310/87 |

FOREIGN PATENT DOCUMENTS

| | | | | | |
|---|---|---|---|---|---|
| DE | 3232949 A1 | * | 3/1984 | ........... | B05B/17/08 |
| DE | 3418991 A1 | * | 11/1984 | ........... | F04D/13/06 |
| DE | 4337923 | | 5/1995 | | |
| DE | 29917346 U1 | * | 2/2000 | ............ | E03B/9/20 |
| GB | 2282440 A | * | 4/1995 | ............ | F21P/7/00 |
| JP | 02063570 A | * | 3/1990 | ........... | B05B/17/08 |

* cited by examiner

*Primary Examiner*—Joseph Waks
(74) *Attorney, Agent, or Firm*—R. Neil Sudol; Henry D. Coleman; William J. Sapone

(57) ABSTRACT

A multiple-function pumping device includes a pump for supplying at least one jet, an electric motor with a stator and a rotor for driving the pump, and circuitry for electrically connecting the motor to a main voltage power supply line. The stator is provided with an excitation winding. The stator has electrical circuit components for powering an external lighting device with low voltage. Preferably, the low-voltage powering circuit components include an electric transformer having as a primary circuit the excitation winding of the motor and further include a secondary circuit which is also wound around the stator.

5 Claims, 1 Drawing Sheet

MULTIPLE-FUNCTION PUMPING DEVICE FOR FOUNTAINS, ORNAMENTAL FOUNTAINS AND THE LIKE

TECHNICAL FIELD

The present invention relates a multiple-function pumping device and is applicable in the field of the construction of fountains, ornamental fountains and the like for the outside or for homes.

BACKGROUND ART

It is known that, in accordance with the existing regulations, pumps for fountains may be powered directly using the mains voltage. It is also known that underwater lamps and lighting systems, both for external fountains and for table-top or ornamental fountains, fall within protection class III and must therefore be provided with a transformer which reduces the mains voltage to a maximum safety value of 24 V.

The solutions known from the prior art in this field essentially consist of two different types.

A first type of solution uses a transformer for supplying power in parallel both to the pump which circulates the water in the fountain and to the lighting system. This solution may be advantageously used for low-power pumps and lighting systems. The main drawback of this solution consists in the fact that the transformer must have a size suitable for satisfying the power requirements of both the pumping and the lighting system. When the power required jointly for pumping and lighting increases beyond certain values, the cost of the transformer is such that this solution becomes difficult to realize from a cost point of view.

According to a second type of solution, the pump for circulating the water is powered from the mains voltage, while the lighting system is powered by a separate transformer. This solution is preferred when the power of the pump is such as to require a very large and costly transformer. It is therefore preferred to power only the lighting system with low voltage, using low-power transformers which still have an acceptable cost.

Two examples of embodiment, which belong to this second type of solution, are described in U.S. patent publication Ser. No. 6,196,471 and German patent No. 4337923. In both these examples, a separate transformer is connected to the lighting system and has exclusively the function of lowering the power supply voltage of the lighting system to the safety voltage of 12 V.

The drawback of using a separate transformer for the lighting system consists in the fact that it introduces a complication into the overall system and an additional cost. It is therefore necessary to find a housing of suitable shape and size for the transformer and perform the necessary connections in a safe manner. The number of additional components to be acquired and assembled comprises the transformer, the cables and the safety plugs. Moreover, the risk of components being subject to possible faults increases.

U.S. Pat. No. 4,564,889 describes a solution for powering a lighting system for fountains, swimming pools or domestic showers without using a separate transformer. The pressurized water supplied from a direct line or from a circulating pump is used to actuate a rotor connected to a small alternator. In this way the alternating current necessary for powering one or more lamps is generated.

A drawback of this solution may consist in possible discontinuous operation. In fact, a variation in pressure or throughput of the water which causes rotation of the alternator may cause non-uniform operation of the lighting system and unattractive aesthetic effects.

Further disadvantages consist in the limited lighting power which can be obtained and in the inevitable loss of head downstream of the alternator impeller, which may be troublesome or unacceptable.

DISCLOSURE OF THE INVENTION

A general object of the present invention is that of eliminating the abovementioned drawbacks by providing a multiple-function pumping device for fountains, ornamental fountains or the like which has a convenient application.

A particular object is that of providing a multiple-function pumping device for fountains, ornamental fountains or the like which is compact and easy to install.

A further object of the invention is that of providing a multiple-function pumping device for fountains which is low-cost and helps reduce the overall transportation, installation and manufacturing costs.

Another particular object is that of providing a multiple-function pumping device for fountains which is simple, strong and reliable, eliminating separate and additional components which could result in faults.

These objects, together with others, which will emerge more clearly below, are achieved in accordance with claim 1 by a multiple-function pumping device, in particular for fountains, ornamental fountains and the like, comprising a pump for supplying at least one jet, an electric motor with a stator and a rotor for driving the pump, and means for electrically connecting the motor to a mains voltage power supply line. The stator is moreover provided with an excitation winding. The device according to the invention is characterized in that the stator of the motor comprises means for low-voltage powering of external lighting means.

Owing to this particular arrangement it will be possible to obtain a multiple-function pumping device which is compact and can be easily installed.

Preferably, the low-voltage power supply means consist of an electric transformer having as a primary circuit the excitation winding of the motor and comprising a secondary circuit which is also wound onto the stator.

Owing to this particular configuration the costs which are necessary for the production, transportation and installation of the pumping device are significantly reduced. Moreover, the integrated transformer must power only the lighting means and may therefore be of a size suitable for low power values.

BRIEF DESCRIPTION OF THE DRAWINGS

Further features and advantages of the invention will be more clearly understood from the detailed description of some preferred, but not exclusive embodiments of the pumping and lighting device for fountains according to the invention, illustrated by way of a non-limiting example with the aid of the accompanying plate of drawings in which.

DETAILED DESCRIPTION OF A PREFERRED EMBODIMENT

Figure 1:
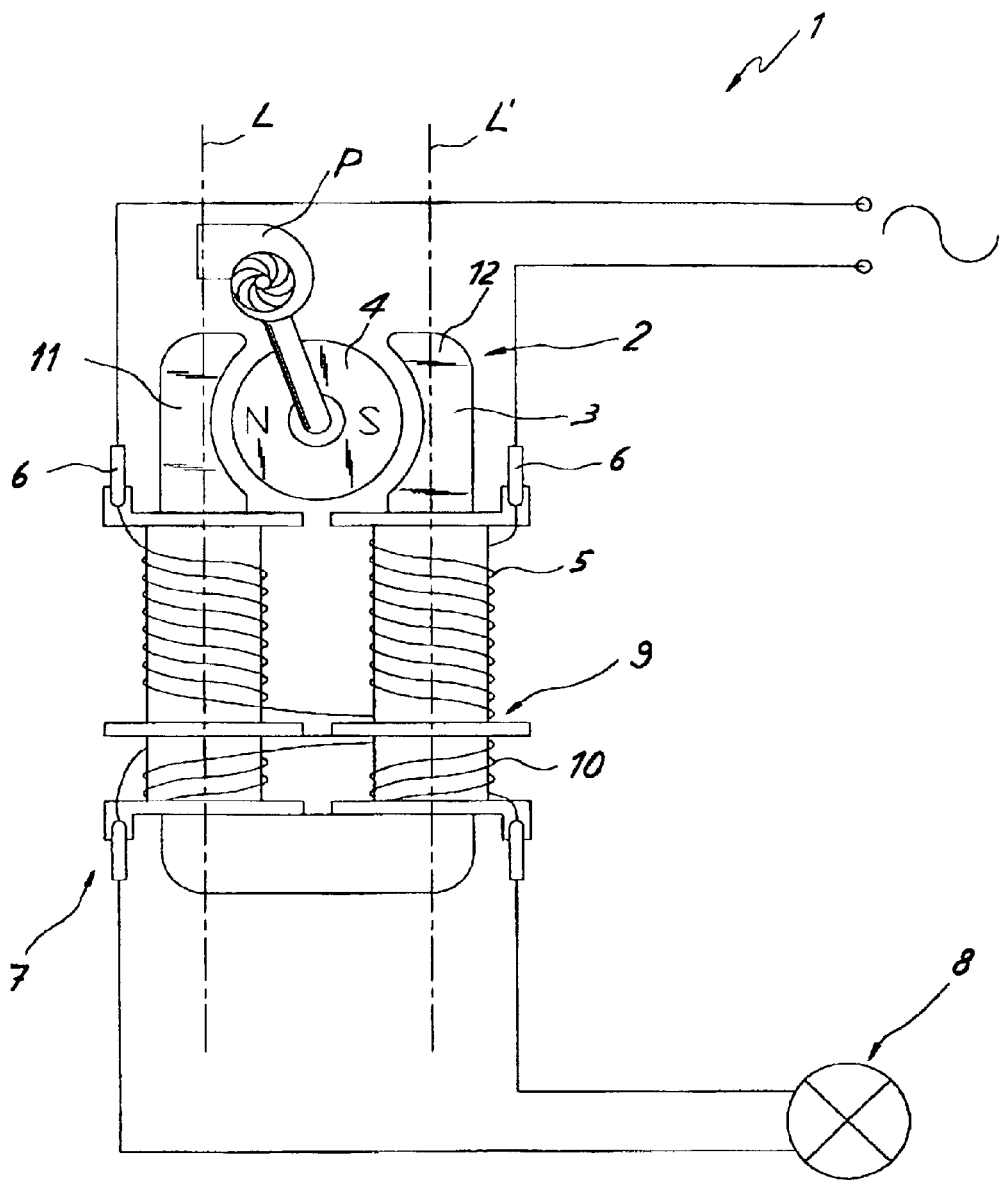
FIG. 1 shows a schematic side view of the multiple-function device according to the invention.

With particular reference to the said FIGURE, a multiple-function pumping device according to the invention is described and denoted in its entirety by the reference number 1.

The pumping device 1 comprises a pump P for supplying one or more water jets of a fountain or ornamental fountain at a sufficient pressure for overcoming any losses in head and creating the desired aesthetic effect. This device 1 has a synchronous electric motor 2 comprising permanent magnets and provided with a stator 3 and a rotor 4. The rotor 4 is mechanically connected to the pump P so as to transmit to it the necessary power. The stator 3 is provided with an excitation winding 5 which is powered by suitable means 6 for electrical connection to a mains voltage power supply line. The pumping device 1 is characterized in that the stator 3 comprises means 7 for the low-voltage powering of lighting means 8.

These low-voltage powering means 7 consist of an electric transformer 9 having as a primary circuit the excitation winding 5 of the motor 2. In this way the excitation winding 5 performs the dual function of causing rotation of the rotor 4 and energizing, by means of mutual induction, the secondary circuit 10 of the transformer 9. This secondary circuit 10 is also wound as an excitation winding 5 around the stator 3.

The excitation winding 5, which coincides with the primary circuit of the transformer 9, has dimensions such as to ensure correct operation of the electric motor 2 using the mains voltage and to power the lighting means 8 with low voltage. In fact, for safety reasons, the maximum voltage, permitted by the existing regulations, for the powering of underwater lamps or lighting systems is 24 V.

Conveniently, the excitation winding 5 and the secondary circuit 10 define one or more longitudinal axes L,L' which are arranged so as to be parallel to each other and form a transformer 9 of the coaxial type.

The stator 3 has two pole shoes 11, 12 around which the excitation winding 5 is arranged. The secondary circuit 10, as well as the excitation winding 5, is wound around both pole shoes 11, 12.

The lighting means 8 may be of various types and have a varying form or number. Preferably, these lighting means 8 comprise one or more incandescent lamps. From among the various types of incandescent lamps, halogen lamps are preferably chosen, owing to their high yield and their particularly long duration over time.

The standards applicable in the sector of transformers stipulate that suitable insulating means must be used. These insulating means may be easily adopted in the pumping device 1 so that all the electrical connections and the device as a whole are particularly safe.

From that described above it is obvious that the device according to the invention achieves the predefined objects and in particular the overall number of components is reduced, improving the reliability and reducing the causes of possible faults. In particular a considerable reduction in the costs is achieved since the expenses for the components and for transportation and assembly thereof are less.

Moreover, with the device according to the invention, it is possible to power the pump motor simply from the mains and reduce the voltage only for the lighting means.

The device according to the invention may be subject to numerous modifications and variations all falling within the inventive idea expressed in the accompanying claims. All the details may be replaced by other technically equivalent elements and the materials may be different according to requirements, without departing from the scope of the invention.

Although the device has been described with particular reference to the accompanying figures, the reference numbers included in the description and in the claims are used in order to facilitate understanding of the invention and do not impose any limitation on the scope of protection claimed.

The instant application is based upon and claims priority of patent application no. VI2002A000070, filed on Apr. 17, 2002 in Italy, the disclosure of which is hereby expressly incorporated here in reference thereto.

What is claimed:

1. A multi-function pumping device for fountains, comprising:

a pump for supplying at least one jet; and an electric motor of the synchronous type with permanent magnets, said electric motor comprising:

a rotor connected to said pump for driving said pump;

a stator having an excitation winding; and means for electrically connecting said motor to a main voltage power supply line, said stator comprising two rectilinear pole shoes spaced apart from one another and oriented substantially parallel to a longitudinal axis of said motor and further comprising low-voltage powering means for powering external low-voltage lighting means, said excitation winding being wound around both of said pole shoes, said rotor having a rotation axis substantially transverse to said longitudinal axis, said low-voltage powering means comprising an electric transformer having a primary circuit consisting of the excitation winding of the motor and a secondary circuit which is mounted onto said stator, wherein said secondary circuit comprises a winding which is wound around both said pole shoes along respective longitudinal axes which are substantially coaxial with the excitation winding of the motor.

2. Device according to claim 1, wherein said primary circuit of the transformer has dimensions sufficient for ensuring correct operation of the electric motor and for powering said lighting means with low voltage.

3. Device according to claim 1, wherein said lighting means comprise at least one incandescent lamps.

4. Device according to claim 3, wherein said at least one incandescent lamp is of the halogen type.

5. Device according to claim 3, wherein said means for electrically connecting said motor to a main voltage power supply line includes suitable insulating means.

* * * * *